(12) United States Patent
Vilpponen et al.

(10) Patent No.: US 9,462,172 B2
(45) Date of Patent: Oct. 4, 2016

(54) METHOD, APPARATUS AND COMPUTER PROGRAM PRODUCT FOR FACILITATING COLOR COMMUNICATION

(71) Applicant: Nokia Corporation, Espoo (FI)

(72) Inventors: Mauri Vilpponen, Espoo (FI); Joni Oja, Helsinki (FI); Janne Lesonen, Helsinki (FI); Esa Mäkeläinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 76 days.

(21) Appl. No.: 14/514,614

(22) Filed: Oct. 15, 2014

(65) Prior Publication Data

US 2015/0110400 A1 Apr. 23, 2015

(30) Foreign Application Priority Data

Oct. 21, 2013 (GB) .................................. 1318531.9

(51) Int. Cl.
*G06K 9/00* (2006.01)
*H04N 5/225* (2006.01)
*H04N 1/60* (2006.01)
*H04N 5/357* (2011.01)
*H04N 9/04* (2006.01)
*H04N 17/00* (2006.01)

(52) U.S. Cl.
CPC ............ *H04N 5/2257* (2013.01); *H04N 1/603* (2013.01); *H04N 1/6033* (2013.01); *H04N 5/2256* (2013.01); *H04N 5/3572* (2013.01); *H04N 9/045* (2013.01); *H04N 17/002* (2013.01); *H04N 2201/0084* (2013.01)

(58) Field of Classification Search
CPC ............. G06K 15/02; G06K 15/1822; G06K 15/1825; G06K 2215/0094; G06T 5/003; G06T 7/0081; G06T 9/00; G06T 9/20; G06T 2207/10024; G06T 2207/20064; G06T 2207/20076; H04N 1/00392; H04N 1/00424; H04N 1/33307; H04N 1/6011; H04N 1/6025; H04N 1/603; H04N 1/6033; H04N 1/6055; H04N 1/6086; H04N 5/2256; H04N 5/2257; H04N 5/3752; H04N 5/4401; H04N 5/46; H04N 5/85; H04N 9/045; H04N 9/69; H04N 9/793; H04N 17/002; H04N 19/20; H04N 2201/0084; H04N 2201/33328; H04N 2201/33378; G09G 3/006; G09G 3/2003; G09G 5/02; G09G 2320/0666; G09G 2320/06936; G01B 27/11
See application file for complete search history.

(56) References Cited

U.S. PATENT DOCUMENTS 6,961,140 B2 * 11/2005 Moore ............... H04N 1/33307
358/1.15

(Continued)

FOREIGN PATENT DOCUMENTS

JP 2011-259047 A 12/2011
WO 2005/125176 A1 12/2005

OTHER PUBLICATIONS

Search Report received for corresponding United Kingdom Patent Application No. 1318531.9, dated May 1, 2014, 3 pages.

*Primary Examiner* — Jose Couso
(74) *Attorney, Agent, or Firm* — Nokia Technologies Oy

(57) ABSTRACT

In accordance with an example embodiment a method, apparatus and computer program product are provided. The method includes computing a first set of tuning parameters indicative of a color correction associated with a media output component of an apparatus. Also, the method includes computing a second set of tuning parameters indicative of a color correction associated with a media capturing component of the apparatus. The first set of tuning parameters and the second set of tuning parameters are associated with the apparatus for facilitating color tuning of the apparatus.

17 Claims, 7 Drawing Sheets

(56) References Cited

U.S. PATENT DOCUMENTS

| | | | | |
|---|---|---|---|---|
| 7,385,739 B2 * | 6/2008 | Ohga | ............... | H04N 1/6011 345/589 |
| 7,768,682 B2 * | 8/2010 | Mestha | ............... | G06K 15/02 345/589 |
| 2007/0092135 A1 * | 4/2007 | Piirainen | ............ | H04N 1/6086 382/167 |
| 2012/0056911 A1 | 3/2012 | Safaee-Rad et al. | | |
| 2012/0281008 A1 | 11/2012 | Marcu et al. | | |
| 2013/0050504 A1 | 2/2013 | Safaee-Rad et al. | | |

* cited by examiner

METHOD, APPARATUS AND COMPUTER PROGRAM PRODUCT FOR FACILITATING COLOR COMMUNICATION

TECHNICAL FIELD

Various implementations relate generally to method, apparatus, and computer program product for facilitating color communication of media content.

BACKGROUND

In recent years, various techniques have been developed for digitization and processing of media content. Examples of media content may include, but are not limited to images, videos and the like. The digitization of the media content facilitates in complex manipulation of the media content for enhancing user experience with the digitized media content. The media content captured by an image-processing device may be manipulated and produced on a display screen of the image-processing device. Examples of the image-processing devices may include fixed and portable electronic devices. Examples of portable electronic devices may include mobile phones, camera, laptop, personal digital assistants (PDAs), and the like. It is desirable that the media content may be captured with camera and produced on the display screen with optimum color reproduction.

SUMMARY OF SOME EMBODIMENTS

Various aspects of example embodiments are set out in the claims.

In a first aspect, there is provided a method comprising: computing a first set of tuning parameters indicative of a color correction associated with a media output component of an apparatus; computing a second set of tuning parameters indicative of a color correction associated with a media capturing component of an apparatus; and associating the first set of tuning parameters and the second set of tuning parameters with the apparatus for facilitating color tuning of the apparatus.

In a second aspect, there is provided an apparatus comprising at least one processor; and at least one memory comprising computer program code, the at least one memory and the computer program code configured to, with the at least one processor, cause the apparatus to at least perform: compute a first set of tuning parameters indicative of a color correction associated with a media output component of an apparatus; compute a second set of tuning parameters indicative of a color correction associated with a media capturing component of an apparatus; and associate the first set of tuning parameters and the second set of tuning parameters with the apparatus for facilitating color tuning of the apparatus.

In a third aspect, there is provided a computer program product comprising at least one computer-readable storage medium, the computer-readable storage medium comprising a set of instructions, which, when executed by one or more processors, cause an apparatus to at least perform compute a first set of tuning parameters indicative of a color correction associated with a media output component of an apparatus; compute a second set of tuning parameters indicative of a color correction associated with a media capturing component of an apparatus; and associate the first set of tuning parameters and the second set of tuning parameters with the apparatus for facilitating color tuning of the apparatus.

In a fourth aspect, there is provided an apparatus comprising: means for computing a first set of tuning parameters indicative of a color correction associated with a media output component of an apparatus; means for computing a second set of tuning parameters indicative of a color correction associated with a media capturing component of an apparatus; and means for associating the first set of tuning parameters and the second set of tuning parameters with the apparatus for facilitating color tuning of the apparatus.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 6B of the drawings.

A media content, such as an image or a video content may appear differently when reproduced on different devices, for example, similar devices manufactured by a manufacturer. The difference in appearance of the media content may be attributed to a variation in luminance as well as color reproduction associated with input and/or output components of different devices. Due to color variation in the input and/or output component, for example camera and/or display, the same source image may appear different in two similar devices coming adjacent to each other from a production line. Herein, the difference in color of the source images of the same scene may be attributed to imperfect color communication of the devices capturing the source images. In order to counter the difference in color reproduction by different devices, one or more tuning files associated with each color-processing component of each of the devices may be provided in the devices. Examples of the color-processing components may include one or more media capturing components such as camera and media output components such as UI, display screen, projector and the like.

In an embodiment, the one or more tuning files may include tuning parameters for the various color-processing components of the device. The tuning parameters associated with various color-processing components of the device may collectively facilitate in color tuning of the device thereby facilitating color communication in the device. In various embodiments described herein, methods and systems have been provided for color tuning of the media content, wherein the media content captured by the device may be reproduced substantially at the output of the device. An example set-up configured for facilitating color tuning in media content is described with reference to FIG. 1. An example device for facilitating color tuning is described with reference to FIG. 2.

Figure 1:
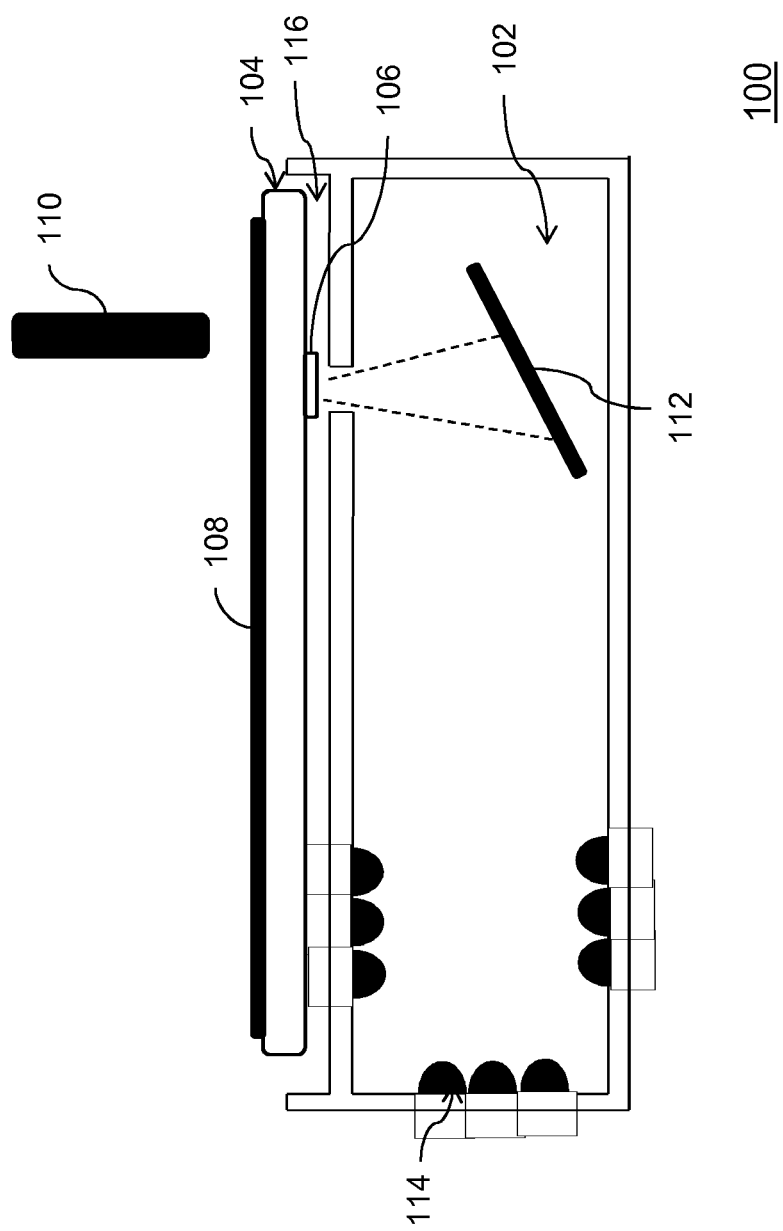
FIG. 1 illustrates an example set-up environment for facilitating color tuning in accordance with an example embodiment.

FIG. 1 illustrates an exemplary test environment set-up 100 for color tuning in media content in accordance with an example embodiment. In an embodiment, the set-up 100 may be a controlled and monitored to allow testing and verification of devices for color tuning. In an embodiment, a device manufacturer may utilize the set-up 100 to facilitate color tuning/optimization of the devices. Examples of the device may include electronic devices. In an embodiment, the electronic devices may include media capture and/or media output components. Examples of electronic devices include mobile phones, laptops, personal digital assistant (PDA) and the like.

In an example embodiment, the set-up 100 may include a jig, compartment 102, or the like that may be configured to hold or enclose an electronic device such as a device 104, and control a motion of the device 104. In an embodiment, wherein the setup 100 comprises a jig, for example, a jig 116 for holding the device 104 within the compartment 102, the set-up 100 may be enclosed in controlled environment. In an embodiment, the device 104 may include media capturing and/or media output capabilities. The device 104 may include a media capturing component 106, for example a single camera or multiple cameras may might act as a single camera or be individual ones, and a media output component 108, for example a display. In an embodiment, the jig-like test set-up 100 holding the device 104 may include, for example, a light-controlling compartment such as the compartment 102 that may be configured to test the device 104 for color communication. In an embodiment, testing the device 104 may include testing the media capturing component 106 and the media output component 108 of the device 104 for color communication and/or tuning.

In an embodiment, testing the media output component of the device 104 for color optimization may include outputting a test color, for example, a red color [R:255 B:0 G0] at the media output component 108. The color output at the media output component 108 may be compared with a reference color or the known color coordinate of the shown test color to determine an error in the output color. Herein, comparing the output color with the reference color may refer to comparison of an output color data associated with the output color with a reference color data associated with the reference color. Also, herein the comparison of the output color data with the reference color data may include comparing the color coordinates of the output color with the corresponding color coordinates of the reference colors in a same color space. In an embodiment, the comparison of the output color data with the reference color data may be performed by utilizing a color measurement device 110. Examples of the color measurement device 110 may include a tricolorimeter, a spectrometer, camera, and the like. In an embodiment, the color measurement device 110 may measure the output color and compare the output color with a reference color or color coordinate value of a known color to determine the error in the output color. In an alternate embodiment, the color measurement device 110 may measure the output color and send color measurement data to the device 104. The device 104 may compare the color measurement data received from the color measurement device 110 with a reference color data associated with a reference color to determine the error in the output color. In an alternate embodiment, the color measurement device 110 may send the color measurement data to an external computing device for performing comparison of the color measurement data with the reference color data.

In an example embodiment, the media capturing component 106 such as a camera, a camera array or a like may be tested for color optimization. In an embodiment, the test color may include an image of a target surface 112 comprising one or more colors. For example, the target surface 112 may be either plain surface with uniform color, multiple colors, actual test image or surface having different combinations of these in different Z-layers (for example, alternating depth). In an embodiment, the test media may be produced by illuminating the target surface 112 with the test color. In an embodiment, the target surface 112 may include a white board, a test image, a plain test surface, an uneven test surface, a diffuse light environment, and the like. In an example embodiment, the test media may be captured by enclosing the target surface 112 and a plurality of distinct colored light sources such as light sources 114 in the compartment 102 and illuminating the target surface 112 by the distinct color lights associated with known colors. For example, as illustrated in FIG. 1, the device 104 may be held in the jig 116 in a manner that a slit in the compartment 102 may expose the media capturing component 106 to the target surface 112, thereby facilitating capturing of the test media. The color coordinates of the captured test media may be compared with color coordinates of the reference media to determine an error in the color of media capturing component 106 of the device 104.

In an embodiment, the set-up 100 may be configured to perform testing when the device 104 comprises multiple media capturing components such as cameras which might be facing different directions. In an embodiment, the cameras may be tuned at the same time or consecutively. In an embodiment, an ambient light sensor(s) configured on the side(s) of the camera or opposite side(s) may also be utilized for performing testing. In an embodiment, a color measurement device other that the color measurement device 110 may be enclosed in the compartment 102 to measure actual lighting conditions inside the compartment 102.

In an embodiment, separate tuning parameters may be computed and applied to the media capturing component 106 and the media output component 108, thereby ensuring that both the media capturing pipeline and the media output pipeline are optimized to produce correct colors. In an embodiment, the tuning parameters may be computed and applied by the manufacturer. In an example embodiment, the set-up 100 may facilitate in performing verification of the imaging pipeline of the device 104 by capturing a media content and measuring the color of the output media content through the media output component 108 of the device 104.

In an embodiment, the set-up 100 allows various components of the device 104 to be tested for color optimization. The set-up 100 facilities in determining error associated with various components of an imaging pipeline of a device, and further correction of the errors associated with individual devices. In addition, the error may be computed for every device on the pipeline, and error correction parameters or tuning parameters for individual components may be stored in respective devices.

Figure 2:
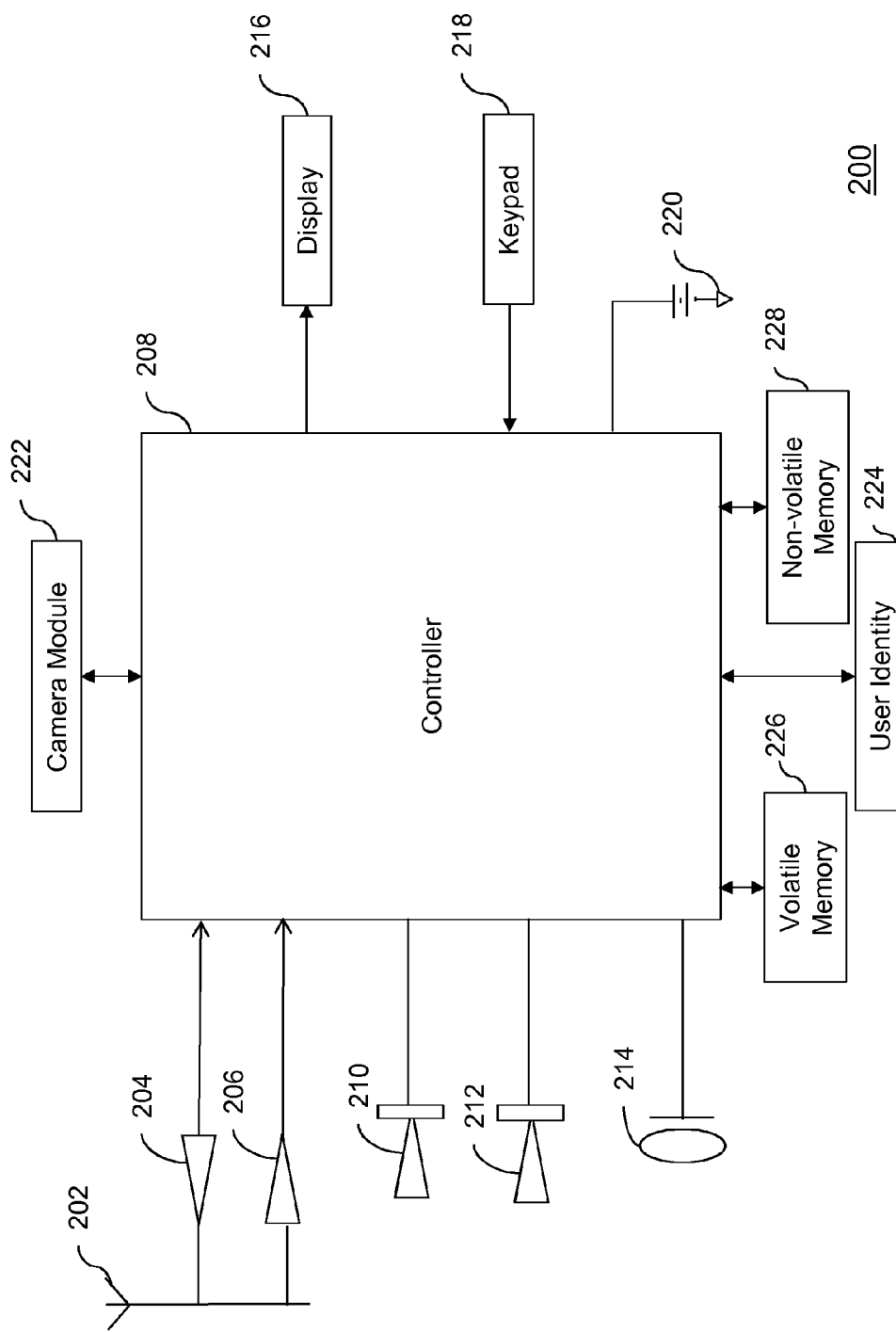
FIG. 2 illustrates a device in accordance with an example embodiment.

FIG. 2 illustrates a device 200 in accordance with an example embodiment. In an embodiment, the device 200 may be an example of the device 104 (refer to FIG. 1). It should be understood, however, that the device 200 as illustrated and hereinafter described is merely illustrative of one type of device that may benefit from various embodiments, therefore, should not be taken to limit the scope of the embodiments. As such, it should be appreciated that at least some of the components described below in connection with the device 200 may be optional and thus in an example embodiment may include more, less or different components than those described in connection with the example embodiment of FIG. 2. The device 200 could be any of a number of types of electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, wearable devices, or any combination of the aforementioned, and other types of communications devices.

The device 200 may include an antenna 202 (or multiple antennas) in operable communication with a transmitter 204 and a receiver 206. The device 200 may further include an apparatus, such as a controller 208 or other processing device that provides signals to and receives signals from the transmitter 204 and receiver 206, respectively. The signals may include signaling information in accordance with the air interface standard of the applicable cellular system, and/or may also include data corresponding to user speech, received data and/or user generated data. In this regard, the device 200 may be capable of operating with one or more air interface standards, communication protocols, modulation types, and access types. By way of illustration, the device 200 may be capable of operating in accordance with any of a number of first, second, third and/or fourth-generation communication protocols or the like. For example, the device 200 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 200 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wire line telecommunication networks such as public switched telephone network (PSTN).

The controller 208 may include circuitry implementing, among others, audio and logic functions of the device 200. For example, the controller 208 may include, but are not limited to, one or more digital signal processor devices, one or more microprocessor devices, one or more processor(s) with accompanying digital signal processor(s), one or more processor(s) without accompanying digital signal processor (s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 200 are allocated between these devices according to their respective capabilities. The controller 208 thus may also include the functionality to convolutionally encode and interleave message and data prior to modulation and transmission. The controller 208 may additionally include an internal voice coder, and may include an internal data modem. Further, the controller 208 may include functionality to operate one or more software programs, which may be stored in a memory. For example, the controller 208 may be capable of operating a connectivity program, such as a conventional Web browser. The connectivity program may then allow the device 200 to transmit and receive Web content, such as location-based content and/or other web page content, according to a Wireless Application Protocol (WAP), Hypertext Transfer Protocol (HTTP) and/or the like. In an example embodiment, the controller 208 may be embodied as a multi-core processor such as a dual or quad core processor. However, any number of processors may be included in the controller 108.

The device 200 may also comprise a user interface including an output device such as a ringer 210, an earphone or speaker 212, a microphone 214, an output device such as display 216 or projector, and a user input interface, which may be coupled to the controller 208. The user input interface, which allows the device 200 to receive data, may include any of a number of devices allowing the device 200 to receive data, such as a keypad 218, a touch display, a microphone or other input device. In embodiments including the keypad 218, the keypad 218 may include numeric (0-9) and related keys (#, *), and other hard and soft keys used for operating the device 200. Alternatively or additionally, the keypad 218 may include a conventional QWERTY keypad arrangement. The keypad 218 may also include various soft keys with associated functions. In addition, or alternatively, the device 200 may include an interface device such as a joystick or other user input interface. The device 200 further includes a battery 220, such as a vibrating battery pack, for powering various circuits that are used to operate the device 200, as well as optionally providing mechanical vibration as a detectable output.

In an example embodiment, the device 200 includes a media capturing element, such as a camera, video and/or audio module, in communication with the controller 208. The media capturing element may be any means for capturing an image, video and/or audio for storage, display or transmission. In an example embodiment, the media capturing element is a camera module 222, which may include a digital camera or array of multiple cameras capable of forming a digital image file from a captured image. As such, the camera module 222 includes all hardware, such as a lens or other optical component(s), and software for creating a digital image file from a captured image. Alternatively, or additionally, the camera module 222 may include the hardware needed to view an image, while a memory device of the device 200 stores instructions for execution by the controller 208 in the form of software to create a digital image file from a captured image. In an example embodiment, the camera module 222 may further include a processing element such as a co-processor, which assists the controller 208 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 222 may provide live image data to the display 216. In an example embodiment, the display 216 may be located on one side of the device 200 and the camera module 222 may include a lens positioned on the opposite side of the device 200 with respect to the display 216 to enable the camera module 222 to capture images on one side of the device 200 and present a view of such images to the user positioned on the other side of the device 200. In an embodiment, the camera module(s) may be configured on either side with respect to the display 216. For example, the camera module may be configured on other side of the display for applications involving capturing of media content, however for applications such as video calling one of the cameras may be configured on the same side of the display 216.

The device 200 may further include a user identity module (UIM) 224. The UIM 224 may be a memory device having a processor built in. The UIM 224 may include, for example, a subscriber identity module (SIM), a universal integrated circuit card (UICC), a universal subscriber identity module (USIM), a removable user identity module (R-UIM), or any other smart card. The UIM 224 typically stores information elements related to a mobile subscriber. In addition to the UIM 224, the device 200 may be equipped with memory. For example, the device 200 may include volatile memory 226, such as volatile random access memory (RAM) including a cache area for the temporary storage of data. The device 200 may also include other non-volatile memory 228, which may be embedded and/or may be removable. The non-volatile memory 228 may additionally or alternatively comprise an electrically erasable programmable read only memory (EEPROM), flash memory, hard drive, or the like. The memories may store any number of pieces of information, and data, used by the device 200 to implement the functions of the device 200.

Figure 3:
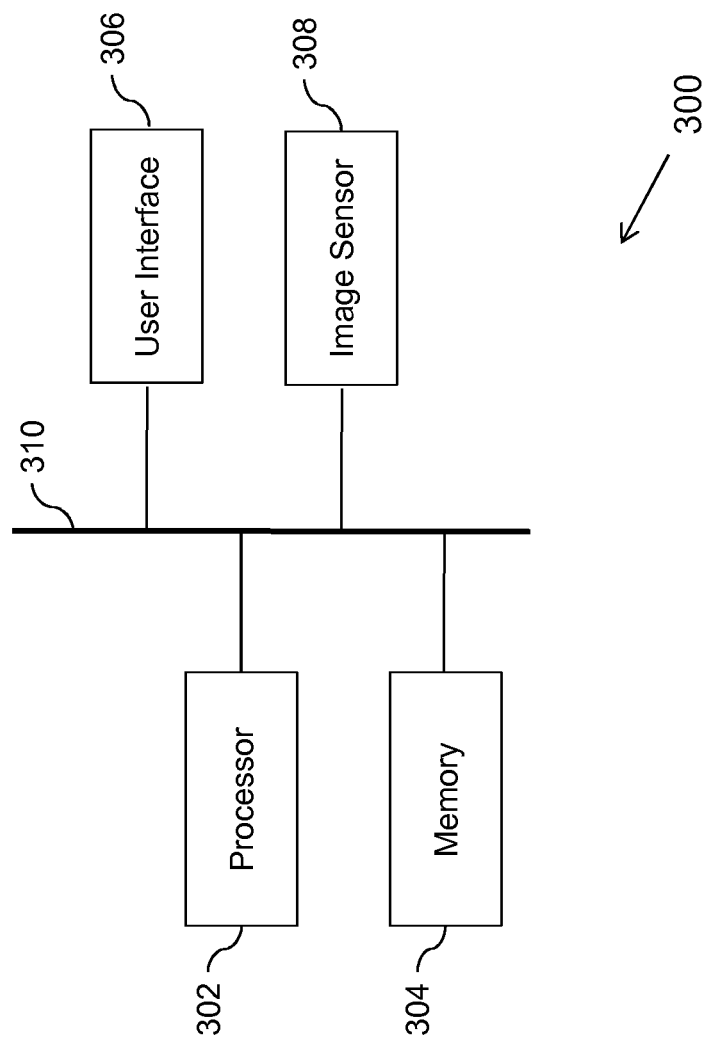
FIG. 3 illustrates an apparatus for facilitating color tuning in accordance with an example embodiment.

FIG. 3 illustrates an apparatus 300 for color tuning, in accordance with an example embodiment. The apparatus 300 for color tuning may be employed, for example, in the device 200 of FIG. 2. However, it should be noted that the apparatus 300, may also be employed on a variety of other devices both mobile and fixed, and therefore, embodiments should not be limited to application on devices such as the device 200 of FIG. 2. Alternatively, embodiments may be employed on a combination of devices including, for example, those listed above. Various embodiments may be embodied wholly at a single device, (for example, the device 200). It should also be noted that some of the devices or elements described below may not be mandatory and thus some may be omitted in certain embodiments.

In an embodiment, the apparatus 300 includes or otherwise is in communication with at least one processor 302 and at least one memory, for example, a memory 304. Examples of the at least one memory 304 include, but are not limited to, volatile and/or non-volatile memories. Some examples of the volatile memory include, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 304 may be configured to store information, data, applications, instructions or the like for enabling the apparatus 300 to carry out various functions in accordance with various example embodiments. For example, the memory 304 may be configured to buffer color data associated with the media content for processing by the processor 302. Additionally or alternatively, the memory 304 may be configured to store instructions for execution by the processor 302.

An example of the processor 302 may include the controller 208. The processor 302 may be embodied in a number of different ways. The processor 302 may be embodied as a multi-core processor, a single core processor; or combination of multi-core processors and single core processors. For example, the processor 302 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 304 or otherwise accessible to the processor 302. Alternatively or additionally, the processor 302 may be configured to execute hard coded functionality. As such, whether configured by hardware or software methods, or by a combination thereof, the processor 302 may represent an entity, for example, physically embodied in circuitry, capable of performing operations according to various embodiments while configured accordingly. For example, if the processor 302 is embodied as two or more of an ASIC, FPGA or the like, the processor 302 may be specifically configured hardware for conducting the operations described herein. Alternatively, as another example, if the processor 302 is embodied as an executor of software instructions, the instructions may specifically configure the processor 302 to perform the algorithms and/or operations described herein when the instructions are executed. However, in some cases, the processor 302 may be a processor of a specific device, for example, a mobile terminal or network device adapted for employing embodiments by further configuration of the processor 302 by instructions for performing the algorithms and/or operations described herein. The processor 302 may include, among other things, a clock, an arithmetic logic unit (ALU) and logic gates configured to support operation of the processor 302.

A user interface (UI) 306 may be in communication with the processor 302. Examples of the user interface 306 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, projector, a microphone, a speaker, ringers, vibrators, and the like. In an example embodiment, the user interface 306 may include, among other devices or elements, any or all of a speaker, a microphone, a display, and a keyboard, touch screen, or the like. In this regard, for example, the processor 302 may comprise user interface circuitry configured to control at least some functions of one or more elements of the user interface 306, such as, for example, a speaker, ringer, microphone, display, and/or the like. The processor 302 and/or user interface circuitry comprising the processor 302 may be configured to control one or more functions of one or more elements of the user interface 306 through computer program instructions, for example, software and/or firmware, stored on a memory, for example, the at least one memory 304, and/or the like, accessible to the processor 302. In an embodiment, the user interface may be an example of a media output component of the apparatus 300.

In an example embodiment, the apparatus 300 may include an electronic device. Some examples of the electronic device include communication device, media capturing device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the electronic device may include a user interface, for example, the UI 306, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 302 operating under software control, or the processor 302 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the communication device may be embodied as to include an image sensor, such as an image sensor 308. The image sensor 308 may be in communication with the processor 302 and/or other components of the apparatus 300. The image sensor 308 may be in communication with other imaging circuitries and/or software, and is configured to capture digital images or to make a video or other graphic media files. The image sensor 308 and other circuitries, in combination, may be an example of the camera module 222 of the device 200 and/or a media capturing component of the apparatus 300.

These components (302-308) may communicate with each other via a centralized circuit system 310. The centralized circuit system 310 may be configured to, among other things, provide or enable communication between the components (302-310) of the apparatus 300. In certain embodiments, the centralized circuit system 310 may be a central printed circuit board (PCB) such as a motherboard, main board, system board, or logic board. The centralized circuit system 310 may also, or alternatively, include other printed circuit assemblies (PCAs) or communication channel media.

In an example embodiment, the processor 302 is configured to, with the content of the memory 304, and optionally with other components described herein, to cause the apparatus 300 to perform color tuning in the apparatus 300. In an example embodiment, the color tuning may be performed for a plurality of color processing components of the apparatus 300, for example a camera component and/or a display component and/or ambient light sensor. In an embodiment, performing color tuning for each of the color processing components includes generating tuning parameters for the color-processing components and thereafter applying the generated tuning parameters to the respective color processing components. In an embodiment, the application of the tuning parameters to the color processing components facilitates in optimizing imaging pipeline of the apparatus 300 to thereby reproduce correct colors.

In an embodiment, the tuning parameters may be indicative of color correction associated with the respective color processing components of the apparatus 300. For example, the apparatus 300 may include color-processing components such as media capturing component (for example, a camera component, an ambient light sensor, and the like) and/or a media output component. In an example embodiment, the processor 302 is configured to, with the content of the memory 304, and optionally with other components described herein, to cause the apparatus 300 to facilitate an access of a first test media content being output at the media output component of the apparatus 300. In an embodiment, an output displaying means may be configured to facilitate the output component of the apparatus 300 to output the first test media content. An example of the output displaying means may include the user interface 306, which may be an example of the display 216.

In an embodiment, the first test media content may be associated with a color such as red, green, blue or a weighted combination of aforementioned colors. For example, the media output component may be configured to display the first test media content of red color. In an embodiment, the output component may output the first red color test image by adjusting RGB values to [R:255B:0G:0]. In an embodiment, the processor 302 is configured to, with the content of the memory 304, and optionally with other components described herein, to cause the apparatus 300 to facilitate output of the first test media content at the apparatus 300.

In an example embodiment, the processor 302 is configured to, with the content of the memory 304, and optionally with other components described herein, to cause the apparatus 300 to determine a first test color data associated with the first test media content. In an embodiment, the first test color data may be determined by a color measurement component associated with the apparatus, for example, the apparatus 300. In an embodiment, the first test color data may include color coordinates associated with the first test media content being output at the apparatus 300. In an embodiment, the color coordinates may be associated with a color space, for example, adobeRGB, sRGB, and the like.

In an embodiment, the apparatus 300 is configured to receive the first test color data from an external measurement device. The color measurement device may receive an output from the media output component and measure the first test color data of the first test media content being output at the media output component. Examples of the external measurement device may include a tricolorimeter, a spectrometer and the like. In an embodiment, a processing means may be configured to receive the first test color data of the first test media content being output at the media output component. An example of the processing means may include the processor 302, which may be an example of the controller 208.

In an example embodiment, the processor 302 is configured to, with the content of the memory 304, and optionally with other components described herein, to cause the apparatus 300 to compare the first test color data with a corresponding first reference color data. In an embodiment, the corresponding first reference color data may include corresponding color coordinates in the selected color space, for example, AdobeRGB color space, sRGB color space and the like and/or color coordinate system. In an example embodiment, the corresponding first reference color data may be stored in the memory of the apparatus. In an alternate embodiment, the corresponding first reference color data may be provided by a device, for example via USB (universal serial bus).

In an embodiment, based on the comparison of the first test color data of the first test media content with the corresponding first reference color data, a first set of tuning parameters may be computed. In an embodiment, the first set of tuning parameters may be indicative of a color correction associated with the media output component of the apparatus 300. In an example embodiment, the first set of tuning parameters may be stored in the apparatus. In an embodiment, a memory means may be configured to store the first set of tuning parameters. An example of the memory means may include the memory 304, which may be an example of the memory 228.

In an example embodiment, the processor 302 is configured to, with the content of the memory 304, and optionally with other components described herein, to cause the apparatus 300 to compute the second set of tuning parameters for performing color tuning of the media capturing component of the apparatus 300. In an embodiment, the second set of tuning parameters may be indicative of color correction associated with the media capturing component of the apparatus. In an embodiment, a second test media content may be captured by the media capturing component of the apparatus 300.

In an embodiment, the second set of tuning parameters may be computed by comparing a second test color data associated with the second test media content with a corresponding second reference color data. In an example embodiment, the second test media content comprises an image of a target surface comprising at least one color. For example, the color of the second test media content may be red, green, blue or any weighted combination of the aforementioned colors. In an embodiment, the second test media content may be associated with a second test color data. In an example embodiment, the second test color data may include, for example linearity parameters, lens shading correction (LSC) parameters, auto white balance (AWB) parameters and/or correction matrix (CCM). In an embodiment, linearity parameters may be associated with sensor linearization. Lens shading refers to a phenomenon wherein an image captured by an image capturing device may exhibit significant shading across the field-of-view. In certain scenarios, lens shading may result in increased brightness in the central portion of the image while the brightness decreases on moving from the edge of the field-of-view. In some other scenarios, the image may be darker on one side and lighter on the other side. The shading might be caused by non-uniform illumination, non-uniform camera sensitivity, or even dirt and dust on glass (lens) surfaces of the image-capturing device. CCM refers to a color correction matrix that may be generated so as to achieve a minimum color perception error when color-matching function associated with image sensors deviated from a desirable human eye response. In an example embodiment, the second reference color data may be stored in the memory of the apparatus. In an alternate embodiment, the second reference color data may be provided by a device, for example via a USB.

In an example embodiment, the processor 302 is configured to, with the content of the memory 304, and optionally with other components described herein, to cause the apparatus 300 to capture the second test media content associated with a distinct color, and determine the second test color data associated with the second test media content. For example, the media capturing component may be configured to capture an image of a white board that may be illuminated by a colored light, for example red. In an embodiment, the media capturing component may capture multiple test images corresponding to distinct colored lights such as red, green, blue or any combination of aforementioned colors. In an embodiment, the second test media content may be a plain surface with multiple colors, actual test image or a surface having different combination in different Z-layers. In an embodiment, the processor 302 is configured to, with the content of the memory 304, and optionally with other components described herein, to cause the apparatus 300 to determine the second test color data of the captured second test media content and compute a difference between the second test color data and a corresponding second reference color data. In an embodiment, the difference between the second test color data and the corresponding second reference color data may facilitate in determination of the second set of tuning parameters. In an embodiment, the second set of tuning parameters may be indicative of tuning to be performed for optimizing the color performance of the media capturing component.

In an example embodiment, the processor 302 is configured to, with the content of the memory 304, and optionally with other components described herein, to cause the apparatus 300 to store the second set of tuning parameters. In an embodiment, a memory means may be configured to store the second set of tuning parameters. An example of the memory means may include the memory 304, which may be an example of the memory 228.

In an embodiment, the processor 302 is configured to, with the content of the memory 304, and optionally with other components described herein, to cause the apparatus 300 to associate the first set of tuning parameters and the second set of tuning parameters with the apparatus. For example, the first set of tuning parameters may be associated with the media output component of the apparatus, and the second set of tuning parameters may be associated with the media capturing component of the apparatus. In an embodiment, the processor 302 is configured to, with the content of the memory 304, and optionally with other components described herein, to cause the apparatus 300 to facilitate color tuning of the apparatus based on the first set of tuning parameters and the second set of tuning parameters associated with the apparatus. In an example embodiment, the tuning of the color information may include tuning of at least one of the media capturing component and the media output component so as to optimize color performance of the apparatus. In an embodiment, the media output component may be tuned by applying the first set of tuning parameters to the first test color data. In an embodiment, the media capturing component may be tuned by applying the second set of tuning parameters to the second test color data associated with the media capturing component, for example camera or camera array.

In an embodiment, the processor 302 is configured to, with the content of the memory 304, and optionally with other components described herein, to cause the apparatus 300 to perform a verification of the color tuning of the apparatus 300 based on the first set of tuning parameters and the second set of tuning parameters. In an embodiment, for performing verification, an access of a third test media content is facilitated. In an embodiment, the third test media content may be captured by the media capturing component of the apparatus 300. In an embodiment, the third test media content is associated with capture of a target surface. In an embodiment, a target surface color data may be associated with the target surface.

In an embodiment, the processor 302 is configured to, with the content of the memory 304, and optionally with other components described herein, to cause the apparatus 300 to determine a third test color data associated with the third test media content. In an embodiment, the third test media content may be processed by a processing component of the apparatus 300 to generate a processed third media content. In an embodiment, a processed media color data may be associated with the processed third test media content. In an embodiment, the processor 302 is configured to, with the content of the memory 304, and optionally with other components described herein, to cause the apparatus 300, to output the processed third media content. In an embodiment, the processed third media content may be output by the media output component associated with the apparatus 300. In an embodiment, the processor 302 is configured to, with the content of the memory 304, and optionally with other components described herein, to cause the apparatus 300, to determine an output media color data associated with the processed third media content.

In an embodiment, the verification of the first set of tuning parameters and the second set of tuning parameters may be performed based on at least two of the target surface color data, the third test color data, the processed media color data, and output media color data. In an example embodiment, the output media color data may be compared with the processed media color data to perform verification of the first set of tuning parameters. In an embodiment, the comparison of the output media color data with the processed media color data may include determining difference between the color coordinates associated with the output media color data and the corresponding color coordinates associated with the processed media color data. In an embodiment, the difference between the output media color data and the processed media color data may be indicative of an error in first set of tuning parameters.

In an embodiment, the processor 302 is configured to, with the content of the memory 304, and optionally with other components described herein, to cause the apparatus 300, to compare the target surface color data with the third test color data to perform verification of the second set of tuning parameters. In an embodiment, the difference between the target surface color data and the third test color data may be indicative of an error in the second set of tuning parameters. Herein, the verification of the imaging pipeline may be performed at a manufacturer's end based on the first set of tuning parameters and the second set of tuning parameters.

In an embodiment, the processor 302 is configured to, with the content of the memory 304, and optionally with other components described herein, to cause the apparatus 300, to determine whether the error associated with the verification of at least one of the first set of tuning parameters and the second set of tuning parameters is greater than or equal to a threshold error. For example, it may be determined whether the difference between the target surface color data and the output media color is greater than the threshold error. If it is determined that the difference between the target surface color data and the output media color is greater than or equal to the threshold error, a color retuning of the apparatus may be performed, and verification of the first set of tuning parameters and the second set of tuning parameters may again be performed. If however, it is determined that the error is less than the threshold error, then the computed first set of tuning parameters and the second set of tuning parameters may be utilized for performing tuning of the apparatus.

In another embodiment, the processor 302 is configured to, with the content of the memory 304, and optionally with other components described herein, to cause the apparatus 300, to determine whether the error associated with the verification of the first set of tuning parameters is greater than or equal to a threshold error. For example, it may be determined whether the difference between the output media color data and the processed media color data is greater than the threshold error. If it is determined that the difference between the output media color data and the processed media color data is greater than the threshold error, a color retuning of the apparatus may be performed, and verification of the first set of tuning parameters may again be performed. If however, it is determined that the error is less than the threshold error, then the computed first set of tuning parameters may be utilized for performing tuning of the apparatus.

In yet another embodiment, the processor 302 is configured to, with the content of the memory 304, and optionally with other components described herein, to cause the apparatus 300, to determine whether the error associated with the verification of the second set of tuning parameters is greater than or equal to a threshold error. For example, it may be determined whether the difference between the target surface color data and the third test color data is greater than the threshold error. If it is determined that the difference between the target surface color data and the third test color data is greater than the threshold error, a color retuning of the apparatus may be performed, and verification of the second set of tuning parameters may again be performed. If however, it is determined that the error is less than the threshold error, then the computed second set of tuning parameters may be utilized for performing tuning of the apparatus.

Herein, different tuning parameters have been determined for different components, for example, the first set of tuning parameters for the output component and the second set of tuning parameters for the camera component, so it is possible to replace the media output component at the time of service of the device employing the apparatus 300. In such a scenario, on replacement of the media output component, the first set of the tuning parameters may also be replaced along with the output component. Herein, since the verification of color tuning of the apparatus is facilitated, a feedback loop for optimizing the tuning parameters of the apparatus 300 is configured. In an embodiment, the feedback loop may be configured for optimizing the second set of tuning parameters associated with the media capturing component of the apparatus.

As discussed, the second set of tuning parameters may be determined based on a comparison of the second test color data with the corresponding second reference color data. In an embodiment, the corresponding second reference color data may be the target surface color data. In an embodiment, the color measurement device may detect whether the target image/target media color data to be captured by the device is correct or not. In other words, the color measurement device may be configured to verify the target media color data. For example, the target object may be illuminated by a full red colored light. In an embodiment, the illumination by the full red colored light may be refer to a control signal, such as control signal [255,0,0]. However, due to some reason such as light source wearing or test system calibration drift, the actual output light may be only [240,0,0]. In an embodiment, the output light being [240,0,0] may refer to a comparable value of the control signal, for example as compared to the dynamic range of a properly working device. Due to the deviation in the color coordinates associated with the light, the color measurement apparatus 300 may detect the light with color coordinates [240,0,0], although the correct color coordinates are [255,0,0], thereby causing wrong calibration settings in the apparatus 300. In an embodiment, a feedback loop may be enabled to facilitate the apparatus 300 in noticing the variations in the media output. In an example embodiment, the apparatus 300 may cause an alarm and terminate the tuning of the first set of tuning parameters and the second set of tuning parameters on determination of variation in the media output. In an alternative embodiment, the apparatus 300 may facilitate in performing compensation of the target surface color data associated with the target board to thereby realize a proper tuning environment.

In some embodiments, the color correction may be performed, by the manufacturer to determine the first set of tuning parameters and the second set of tuning parameters for individual devices. In an embodiment, the first set of tuning parameters and the second set of tuning parameters may be stored in the memory 304 of the apparatus 300 of individual devices such that the processor 302 of the corresponding device may facilitate color correction when the device is in use.

Figure 4:
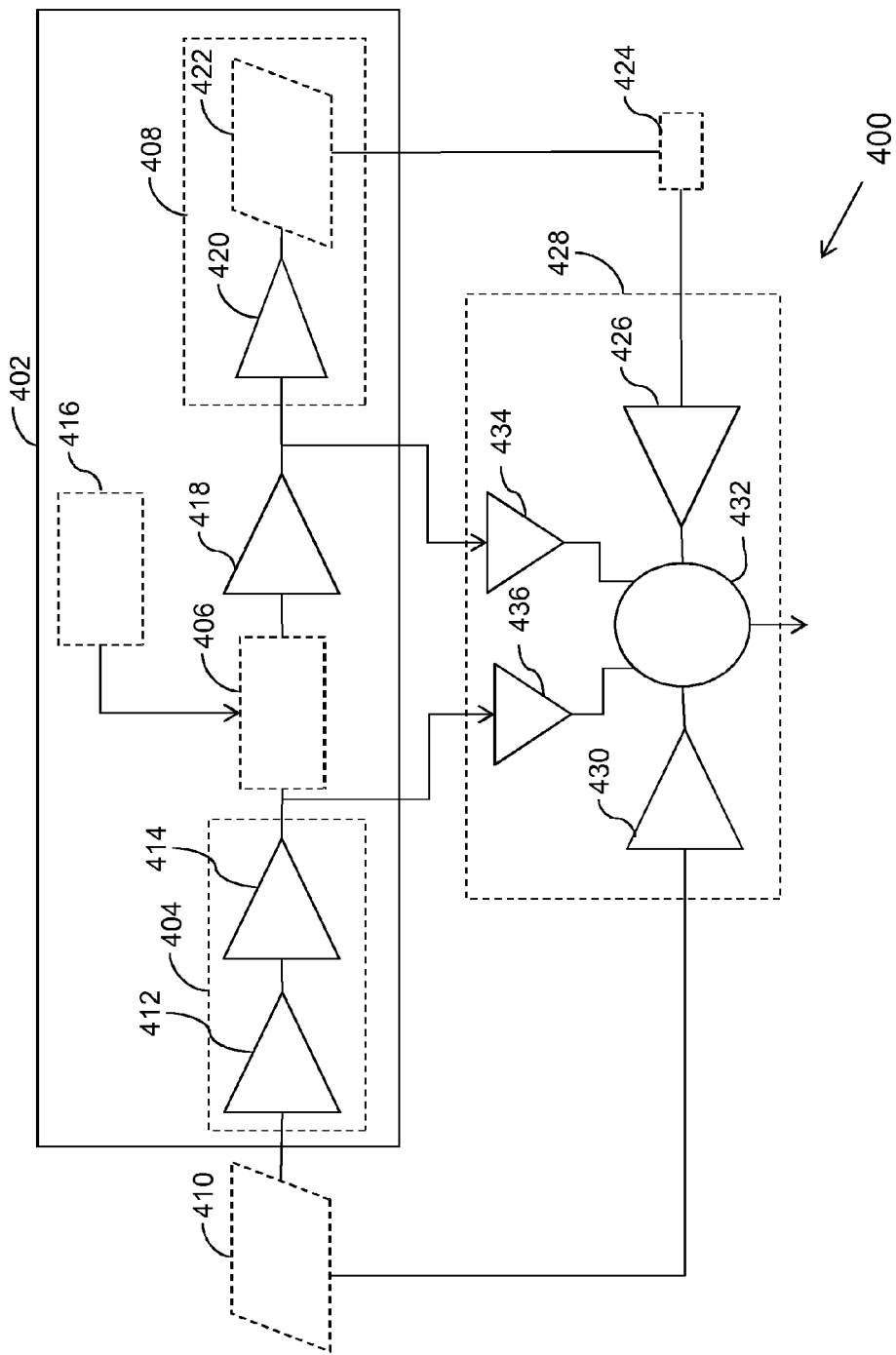
FIG. 4 illustrates a flow diagram for facilitating color tuning, in accordance with an example embodiment.

FIG. 4 illustrates a flow diagram 400 for color tuning in a device 402, in accordance with an example embodiment. The device 402 may be an example of the device 200 (FIG. 2). The device 402 may be configured to capture a media content, process the media content and output the processed media content. In an embodiment, the device 402 may include a media capturing component 404 for capturing a media content, a processing component 406 such as an engine for processing the media content and a media output component 408 for outputting the processed media content. An example of the media capturing component 404 may be a camera component, for example, the camera module 222 (FIG. 2), and an ALS (ambient light sensor). An example of the media output component 408 may be an output component, for example the display 216.

In an embodiment, the flow diagram 400, shown in FIG. 4, may facilitate in computing a first set of tuning parameters and a second set of tuning parameters associated with the media output component 408 and the media capturing component 404, respectively of the device 402. In an embodiment, the flow diagram 400 may further facilitate in performing verification of the first set of tuning parameters and the second set of tuning parameters.

In an embodiment, the flow diagram 400 includes accessing a target surface, for example a target object 410. In an embodiment, the target object 410 may include a surface being illuminated by a light of a known color in a controlled environment. In an embodiment, the term 'known color' may indicate that a color data associated with the color may be predetermined. As discussed with reference to FIG. 3, in an embodiment, the color data associated with the known color may be a second reference color data.

The flow diagram 400 includes capturing a media content, for example an image of a target object (or surface) 410 by the media capturing component 404 at block 412. In an example embodiment, the captured media content may be the second test media content (refer, description of FIG. 3) being captured by the media capturing component 404 of the apparatus. In an embodiment, the second test media content may comprise a second test color data. In an example embodiment, the second test color data may be determined by a color measurement device, for example, a tricolorimeter, a spectrometer, camera, and the like. In an example embodiment, the media capturing component 404 may include multiple sensors for capturing light of predetermined color to determine the second media color data. For example, individual sensors associated with the media capturing component 404 may capture color and/or luminance data associated with the target surface 410. In an embodiment, the device may include a single sensor that may detect different colors in different locations or in different time sequences. In another embodiment, the device may include a plurality of sensors that may be configured to function like a single component or completely differently. For example, the device may include camera arrays or alike, for example ambient light sensor(s). In an embodiment, the second test color data may be compared with the corresponding second reference color data to determine the second set of tuning parameters. In an embodiment, the target color data may be the corresponding second reference color data.

In an embodiment, the captured media content may be the third test media content (refer, description of FIG. 3) being captured by the media capturing component 404 of the apparatus. In an embodiment, the third media content may be associated with a third test color data. At block 414, a pre-processing of the captured media content may be performed. In an embodiment, the pre-processing of the captured media content may be performed by the media capturing component 404. The media capturing component 404 may be coupled with or connected to the processing component 406, for example, the engine. The engine may be configured to manipulate the captured multimedia content based at least on an input from an ambient light sensor (ALS) 416. The ALS 416 along with the engine may be configured to approximate a human eye response to a light under various conditions of lighting. For example, the lighting conditions may include low-light conditions, bright light conditions, sunlight conditions, and the like. The ALS 416 along with the engine may be configured to process and/or manipulate the captured media content for dimming or brightness control as well as color adjustments, and generate a processed media content for output buffer at block 418 and/or at the media capturing component 404. In various example embodiments, the processing of the media content may be performed for multitude of purposes such as providing the optimum viewing in diverse lighting conditions, reducing power consumption, and the like.

In an embodiment, the processed media content, for example, the processed third media content may be provided as input to the media output component 408. A display driver configuration at block 420 may facilitate in the output of the processed third media content, such that an output media is generated at block 422. In an embodiment, the processed output media may be associated with an output media color data. In an embodiment, the output media color data may be determined by a color measurement device. In an embodiment, the color measurement device may be configured internally within the device 402 or may be externally coupled with the apparatus. In an embodiment, the output of the media output component 408 may be provided to the color measurement device such as a sensing element, for example a sensor 424. In an example embodiment, the sensor 424 may be associated with a color measurement device such as a tricolorimeter, a spectrometer, and the like. In an embodiment, the sensor 424 embodied in the color measurement device may be configured to measure the output media color data of the output media content. In an example embodiment, the output of the sensor measurement may be indicative of the output media color data of the output media content.

In an embodiment, the output media color data may be compared with the processed media color data to compute the first set of tuning parameters. In an embodiment, the comparison of the output media color data processed with the media color data may be performed by a controller, for example, a controller 428. For example, the controller 428 may receive the output media color data at block 426 and the processed media color data at block 434, and perform a comparison to generate the first set of tuning parameters. In FIG. 4, the comparison between the output media color data and the processed media color data is shown to be performed outside the device 402. In an embodiment, the comparison between the output media color data and the processed media color data may be performed within the device, by for example, the processing component 406 or the engine.

In an embodiment, a verification of at least one of the first set of tuning parameters and the second set of tuning parameters may be performed at block 428 based on a comparison between two of the target surface color data, the third test color data, the processed media color data and/or output media color data. In an example embodiment, the target surface color data (received at block 430) may be compared with the processed media color data (received at block 434) to perform verification of the first set of tuning parameters and the second set of tuning parameters. In an example embodiment, the output media color data (received at block 426) may be compared with the processed media color data (received at block 434) to perform verification of the first set of tuning parameters. In an example embodiment, the target surface color data (received at block 430) may be compared with the third test color data (received at block 436) to perform verification of the second set of tuning parameters. In an embodiment, the aforementioned comparisons may be performed at block 428 to determine the first set of tuning parameters and/or the second set of tuning parameters and/or verify an error in the computed first set of tuning parameters and/or the second set of tuning parameters. In an embodiment, the block 428 may correspond to a processing component, for example a processor. In an embodiment, the comparison between two of the target surface color data, the third test color data, the processed media color data, and the output media color data as described herein is assumed to be performed outside the device. For example, an outside device such as a USB-enabled device may be configured to receive the target surface color data, the third test color data, the processed media color data, the output media color data, and perform the comparison to determine an error based on the comparison. However, in alternate embodiments, the aforementioned comparisons may be performed within the device embodying the flow diagram 400, for example, by the processing component 406 or the engine. In an embodiment, the processor 302 may be an example of the processing component 406. In an embodiment, on determination of an error being greater than or equal to a threshold error, a color retuning may be performed in the device.

Figure 5:
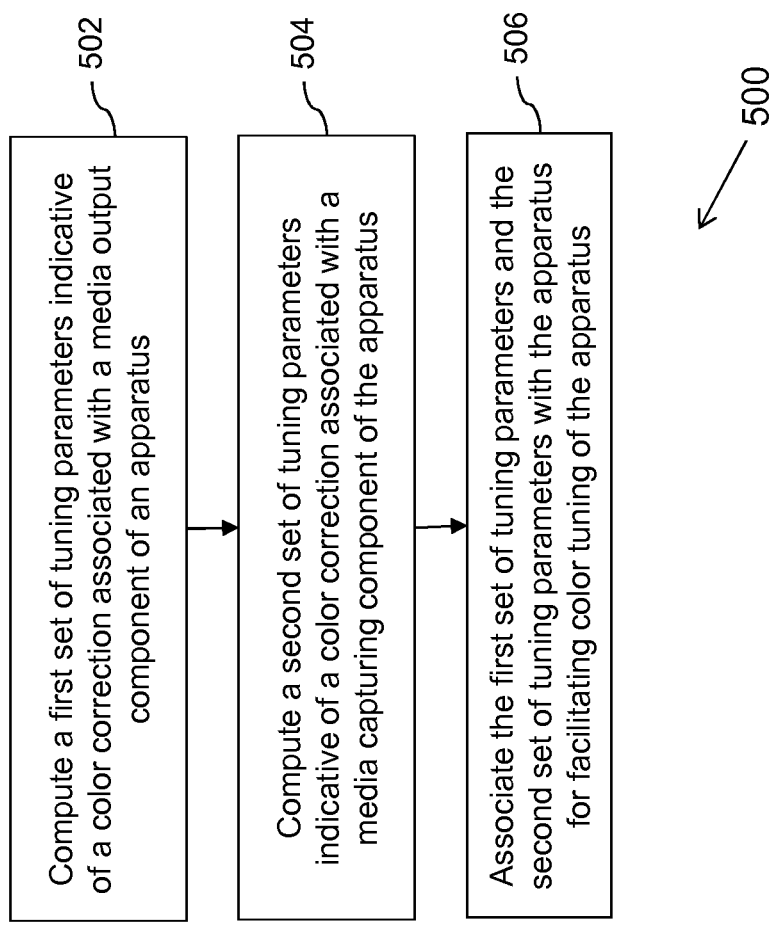
FIG. 5 is a flowchart depicting an example method for facilitating color tuning, in accordance with an example embodiment.

FIG. 5 is a flowchart depicting an example method 500 for color tuning in media content, in accordance with an example embodiment. The method 500 depicted in the flow chart may be executed by, for example, the apparatus 300 of FIG. 3. In an embodiment, the method may be executed by a device that may be configured to capture and output the media content. In an embodiment, the device may be a fixed device or a mobile electronic device such as a mobile phone, a PDA, a laptop and the like. In an embodiment, the media content may include a graphical user interface, an image, a video, a still viewfinder item, and the like. In an embodiment, the method 500 facilitates in performing color tuning of multiple color processing components of the apparatus 300 by utilizing tuning parameters associated with the respective color processing components. Examples of color processing components of the apparatus 300 may include a camera, an image sensor, and an output component. At the output component, the tuning parameters may be applied to the frames shown on the output component such as the display. The frames may include video content, still images, UI and the like.

In an embodiment, a first test media content may be output at the apparatus. In an example embodiment, the first test media content may be output at the apparatus by an output component, for example the display 216 of the device 200 (FIG. 2). In an embodiment, the first test media content may be associated with a distinct color, for example, red color, green color and blue color or any weighted combination of the aforementioned colors. In an embodiment, the first test media content may be associated with a first test color data. In an example embodiment, the first test color data of the first test media content may be determined by a color measurement device. In an embodiment, the color measurement device may be configured to receive an output of the output component and measure the first test color data of the output image. Examples of the color measurement device may include a tricolorimeter, a spectrometer and the like.

In an embodiment, the first test color data may be compared with a corresponding first reference color data. In an embodiment, the corresponding first reference color data may include color coordinate of the output and/or displayed color in a specific color coordinate system. In an embodiment, the color measurement device may compare the first test color data with the corresponding first reference color data. In another embodiment, the color measurement device may send the measured first test color data of the output media content to the apparatus. The apparatus may compare the first test color data with the corresponding first reference color data. At block 502, a first set of tuning parameters may be computed based on the comparison of the first test color data with the corresponding first reference color data. In an embodiment, the first set of tuning parameters may be indicative of a color correction in the media output component of the apparatus. In an example embodiment, the first set of tuning parameters may be stored at the apparatus.

At block 504, a second set of tuning parameters may be computed. In an embodiment, the second set of tuning parameters may be indicative of a color correction in the media capturing component of the apparatus. In an embodiment, the second set of tuning parameters may be computed by accessing second test media content captured by the media capture component of the apparatus. In an embodiment, the second test media content may be associated with a distinct color or optical distortion test-images. In an embodiment, the second test media content include a second test color data. In an embodiment, the second test color data may be compared with a corresponding second reference color data for computing the second set of tuning parameters. In an embodiment, the second reference color data may be associated with a second reference media content. In an embodiment, the second set of tuning parameters may be stored in the apparatus.

In an embodiment, the second reference media content may include an image of a white board illuminated by the distinct color. For example, the second reference media content may include the images of white board being illuminated by a light of red, green, blue color, or any combination of aforementioned colors. In an example embodiment, a color measurement device may be enclosed in a set-up for measuring lighting conditions inside the set-up, to make a feedback loop for camera measurement.

At block 506, the first set of tuning parameters and the second set of tuning parameters may be associated with the apparatus. In an embodiment, the first set of tuning parameters may be associated with the media output component of the apparatus, and the second set of tuning parameters may be associated with the media capturing component of the apparatus. In an embodiment, the first set of tuning parameters may facilitate in tuning of the media output component while the second set of tuning parameters may facilitate in tuning of the media capturing component of the apparatus, thereby facilitating in tuning an imaging pipeline of the apparatus.

In an example embodiment, a processing means may be configured to perform some or all of: computing a first set of tuning parameters indicative of a color correction associated with a media output component of an apparatus; computing a second set of tuning parameters indicative of a color correction in a media capturing component of the apparatus; and associating the first set of tuning parameters and the second set of tuning parameters with the apparatus for facilitating color tuning of the apparatus. An example of the processing means may include the processor 302, which may be an example of the controller 208.

Figure 6A:
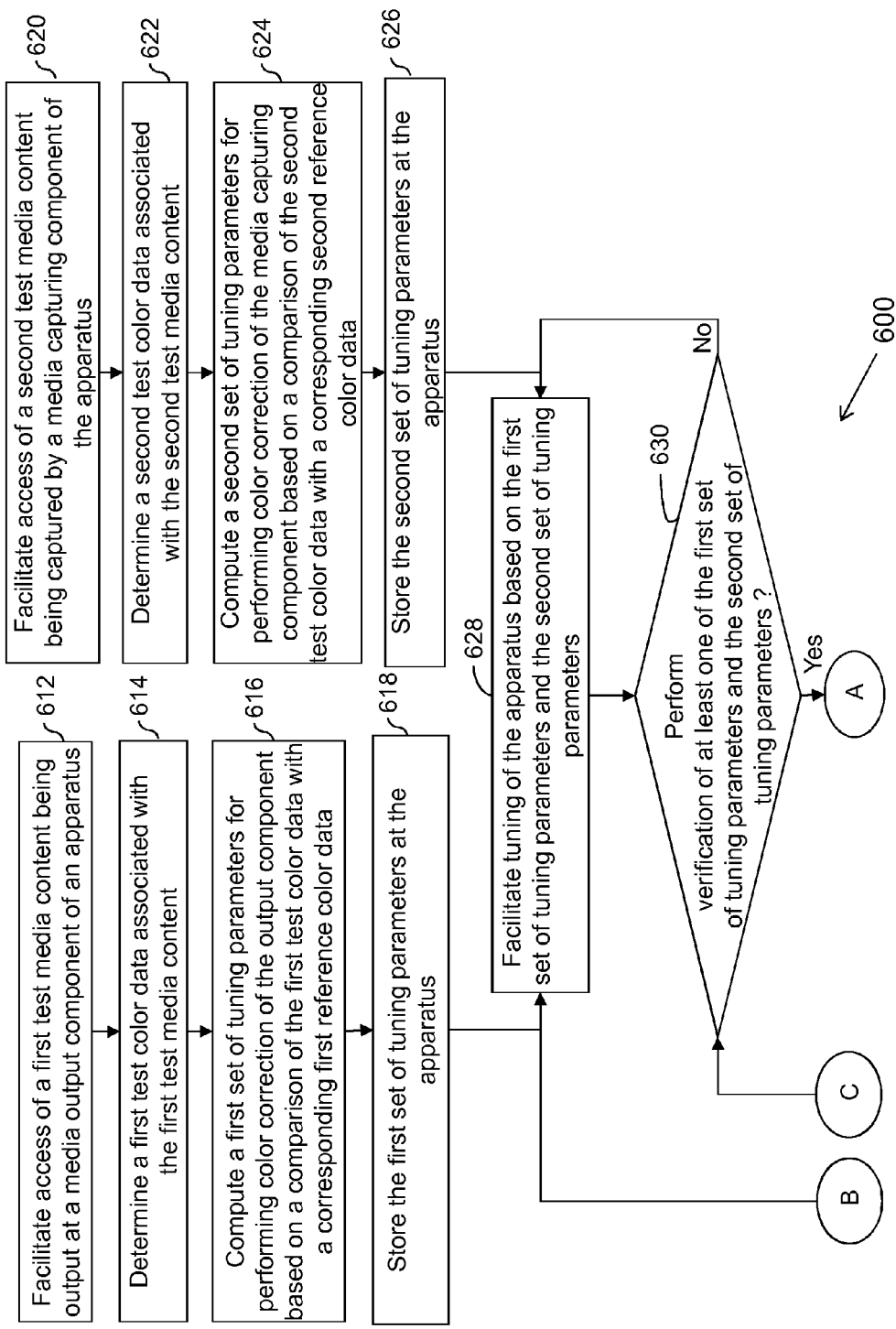
FIGS. 6A and 6B is a flowchart depicting an example method for facilitating color tuning, in accordance with an example embodiment.
Figure 6B:
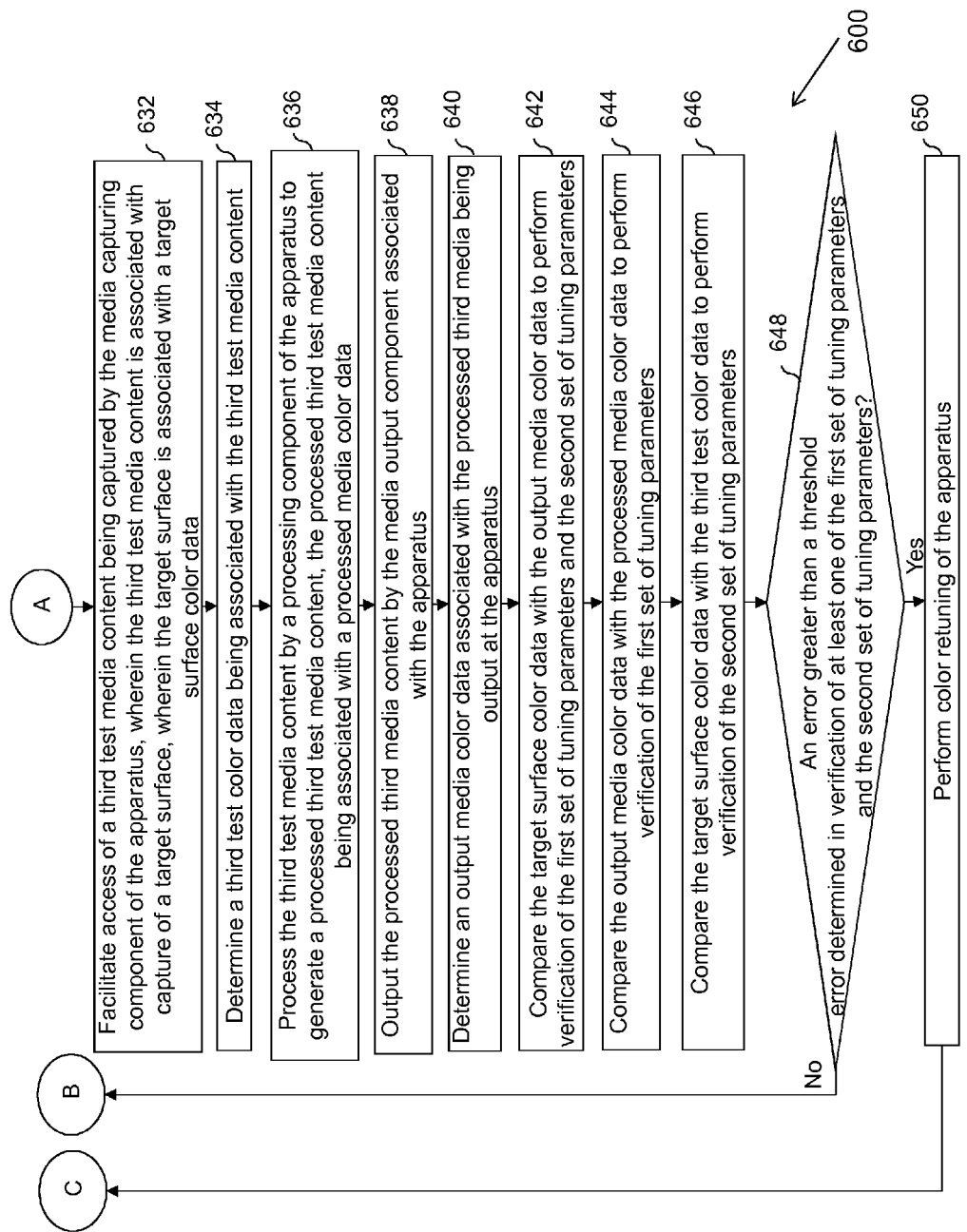

FIGS. 6A and 6B is a flowchart depicting an example method 600 for color tuning, in accordance with an example embodiment. The method 600 depicted in the flow chart may be executed by, for example, the apparatus 300 of FIG. 3. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 600 are described with help of apparatus 300 of FIG. 3. However, the operations of the method can be described and/or practiced by using any other apparatus.

The method 600 provides steps for color correction in devices configured to capture and output media content. In an embodiment, method 600 may be executed by a device, for example, the device 200 (FIG. 2). In an embodiment, the method 600 facilitates in computing and applying tuning parameters associated with individual color processing components of the device, thereby enabling optimization of the media capture pipeline and the media output pipeline of the device for substantially reproducing the colors. Examples of the color processing components may include, but are not limited to, media capturing components such as a camera component, a sensing component such as an ALS, and media output component such as a display component, and the like.

At block 612 of method 600, an access of a first test media content being output at a media output component of an apparatus is facilitated. In an embodiment, the apparatus may be an example of the apparatus 300 (FIG. 3). In an embodiment, the first test media content may include an image. In an embodiment, the first test media content may be associated with a distinct color. For example, the color of the first test media content may be red, green, blue or any weighted combination of the aforementioned colors. In an embodiment, the apparatus may include display driver for facilitating the display of the color of the first test media content.

At block 614, a first test color data associated with the first test media content is determined. In an embodiment, the first test color data may be determined by a color measurement component associated with the apparatus, for example, the apparatus 300. In an example embodiment, the first test color data may be received from an external color measurement device. In an example embodiment, the color measurement device may be configured to determine the first test color data of the first test media content and provide the measured first test color data based on the determination. For example, the output component of the apparatus may output a first test media content, for example a green color media content, and the color measurement device may measure the color coordinates of the green colored media content displayed at the media output component. In an example embodiment, the color measurement device may be configured to compute and send the first test color data to the apparatus.

In an embodiment, the first test color data of the first media content may be compared with a corresponding first reference color data. In an embodiment, the corresponding first reference color data may include corresponding color coordinates in a selected color space, for example, AdobeRGB color space, sRGB color space and the like and/or color coordinate system. In an embodiment, the external color measurement device may be configured to perform the comparison between the first test color data and the corresponding first reference color data. In another embodiment, the apparatus may be configured to perform the comparison between the first test color data and the corresponding first reference color data. For example, the apparatus may receive the first test color data from the measurement device, and compare the first test color data with the corresponding first reference color data. In an embodiment, the first reference color data may be stored in a memory of the apparatus. Based on the comparison of the first test color data of the first media content with the corresponding first reference color data, a first set of tuning parameters may be computed at block 616. In an embodiment, the first set of tuning parameters may be indicative of error correction to be performed in the color of the first test media content, and may facilitate in performing a color correction of the output component of the apparatus. At block 618, the first set of the tuning parameters may be stored in the apparatus. In an example embodiment, the first set of tuning parameters may be stored in a memory, for example, the memory 304 (FIG. 3) of the apparatus 300.

In an embodiment, the method 600 includes facilitating access of a second test media content being captured by the media capturing component of the apparatus, at block 620. In an embodiment, the second test media content may include an image of a target surface comprising at least one color. For example, the color of the second test media content may be red, green, blue or any weighted combination of the aforementioned colors. At block 622, a second test color data associated with the second test media content may be determined. In an embodiment, the second test color data may be determined by an external color measurement device. In an embodiment, the second test color data may be determined by the apparatus. The second test color data may be compared with a corresponding second reference color data. In an embodiment, the corresponding second reference color data may include corresponding color coordinates in a selected color space, for example, AdobeRGB color space, sRGB color space and the like and/or color coordinate system.

At block 624, a second set of tuning parameters may be computed based on the comparison of the second test color data with the corresponding second reference color data. In an embodiment, the second set of tuning parameters may facilitate in performing color correction of the media capturing component of the apparatus. At block 626, the second set of tuning parameters may be stored in the apparatus. In an example embodiment, the second set of tuning parameters may be stored in a memory, for example, the memory 304 (FIG. 3) of the apparatus 300.

At block 626, the second set of tuning parameters may be stored in the apparatus. At block 628, the first set of tuning parameters may facilitate in color tuning of the output component, and the second set of tuning parameters may facilitate in color tuning of the media capturing component of the apparatus, thereby facilitating in the color tuning of an imaging pipeline of the apparatus. It will be understood that the first set of tuning parameters and the second set of tuning parameters may not be used simultaneously for performing tuning of the output component and the camera component, respectively.

In an embodiment, the method 600 for color tuning may be performed by a manufacturer of the apparatus. In an embodiment, the method 600 for color tuning may be applied individually to multiple apparatuses on a production line such that for each apparatus, the first set of tuning parameters and the second set of tuning parameters may be computed individually and stored in a memory of the respective apparatus. In another embodiment, the method for color tuning may be applied to the apparatus in use.

At block 630, it is determined whether a verification of at least one of the first set of tuning parameters and the second set of tuning parameters is to be performed. In an example embodiment, on determining that the verification of the at least one of the first set of tuning parameters and the second set of tuning parameters is to be performed, the image capturing component of the apparatus may be facilitated to access a third test media content at block 630. In an embodiment, the third test media content may be associated with capture of a target surface by the media capturing component of the apparatus. In an embodiment, the target surface may be associated with a target surface color data. In an embodiment, the target surface color data may include color coordinates of a color of the target surface.

At block 634, a third test color data associated with the third test media content is determined. In an embodiment, the third test color data may include color characterization parameters associated with the third test media content. Examples of the color characterization parameters include, but are not limited to, linearity correction parameters, LSC parameters, AWB parameters and CCM. At block 636, the third test media content may be processed by a processing component, for example, an engine of the apparatus, as explained with reference to FIG. 4. On processing of the third test media content, a processed third test media content may be generated. In an embodiment, the processed third test media content may be associated with a processed third test color data. At block 638, the media output component of the apparatus may output the processed third media content. At block 640, an output media color data associated with the processed third media is determined. In an embodiment, the output media color data may be determined by a color measurement device. In an embodiment, the color measurement device may be external to the apparatus. In an example embodiment, a color measurement component corresponding to the color measurement device is embodied in the apparatus. The color measurement component may be configured to determine the output media color data.

At block 642, the target surface color data may be compared with the output media color data to perform verification of the first set of tuning parameters and the second set of tuning parameters. The comparison of the target surface color data with the output media color data may include comparing the color coordinates associated with the target surface color data and the corresponding color coordinates associated with the output media color data. The comparison of the target surface color data with the output media color data is explained with reference to FIG. 4. In an embodiment, for the purpose of comparison, the color coordinates associated with the target surface color data and the output media color data may be associated with a same color space. In an embodiment, a difference between the target surface color data and the output media color may be determined. Herein, the difference between the target surface color data and the output media color may be termed as an error. In an embodiment, the error may be indicative of an error in the computations of the first set of tuning parameters and the second set of tuning parameters.

In an embodiment, the method 600 may facilitate in detecting error in the computation of the first set of the tuning parameters and the second set of tuning parameters separately. For example, at block 644, the output media color data may be compared with the processed media color data to perform verification of the first set of tuning parameters. In an embodiment, the comparison of the output media color data with the processed media data may include determining difference between the color coordinates associated with the output media content and the processed third media content. In an embodiment, the difference between the output media color data and the processed third media data may be indicative of an error in first set of tuning parameters.

At block 646, the target surface color data may be compared with the third test color data to perform verification of the second set of tuning parameters. In an embodiment, a difference between the target surface color data and the third test color data may be indicative of an error in the second set of tuning parameters.

At block 646, it is determined whether the error associated with the verification of at least one of the first set of tuning parameters and the second set of tuning parameters is greater than or equal to a threshold error. For example, it may be determined whether the difference between the target surface color data and the output media color is greater than the threshold error. If it is determined that the difference between the target surface color data and the output media color is greater than the threshold error, a color retuning of the apparatus may be performed at block 650, and verification of the first set of tuning parameters and the second set of tuning parameters may again be performed at block 630. If however, it is determined that the error is less than the threshold error, then the computed first set of tuning parameters and the second set of tuning parameters may be utilized for performing color tuning of the apparatus.

In another embodiment, it is determined whether the error associated with the verification of the first set of tuning parameters is greater than or equal to a threshold error. For example, it may be determined whether the difference between the output media color data and the processed media color data is greater than the threshold error. If it is determined that the difference between the output media color data and the processed media color data is greater than the threshold error, a color retuning of the apparatus may be performed at block 650, and verification of the first set of tuning parameters may again be performed at block 630. If however, it is determined that the error is less than the threshold error, then the computed first set of tuning parameters may be utilized for performing tuning of the apparatus.

In yet another embodiment, it is determined whether the error associated with the verification of the second set of tuning parameters is greater than or equal to a threshold error. For example, it may be determined whether the difference between target surface color data with the third test color data is greater than the threshold error. If it is determined that the difference between the target surface color data with the third test color data is greater than the threshold error, a color retuning of the apparatus may be performed at block 650, and verification of the second set of tuning parameters may again be performed at block 630. If however, it is determined that the error is less than the threshold error, then the computed second set of tuning parameters may be utilized for performing tuning of the apparatus.

To facilitate discussion of the methods 500 and/or 600 of FIGS. 5 and 6A-6B, certain operations are described herein as constituting distinct steps performed in a certain order. Such implementations are exemplary and non-limiting. Certain operation may be grouped together and performed in a single operation, and certain operations can be performed in an order that differs from the order employed in the examples set forth herein. Moreover, certain operations of the methods 500 and/or 600 are performed in an automated fashion although manual/human/operator interaction could be used. These operations involve substantially no interaction with the user. Other operations of the methods 500 and/or 600 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to perform color tuning/correction. As explained in FIGS. 1-6B, the embodiments disclosed herein provide methods and devices for performing color correction/tuning in media capturing and media output devices.

In various embodiments, color tuning of the devices may be performed during manufacturing of the device on the production line. In an embodiment, color tuning of the devices includes performing color tuning of the individual color processing components of each device. Color processing components of the device may include media capturing components, output components and the like. In an example embodiment, for each of the color processing components, a set of tuning parameters may be computed and associated with the respective components. Associating the tuning parameters with respective color processing components has the advantage that the complete imaging pipeline of the apparatus may be color tuned. Another advantage of separate set of tuning parameters for individual components such as the media output component and the media capturing component is that the component replacement is facilitated without affecting the output colors of the apparatus. For example, on replacement of the display component during the service, the set of tuning parameters may also be replaced according to the replaced component. For example at a production site, a USB-host controlled measurement may be employed to facilitate the device's display component to produce at least one first test image and measure the color of the at least one first test image, thereby enabling the computation of the first set of tuning parameters. For the camera component, the USB-host may handle the raw content captured by the camera component and compare the output of the camera component with the at least one second reference image, thereby enabling the generation of the second set of tuning parameters. In another embodiment, the color tuning may be performed in the device, for example for performing an after-market local service support.

Various embodiments described above may be implemented in software, hardware, application logic or any combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIG. 3. A computer-readable medium may comprise a computer-readable storage medium that may be any media or means that can contain or store the instructions for use by or in connection with an instruction execution system, apparatus, or device, such as a computer. In one example embodiment, the computer readable medium may be non-transitory.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present disclosure as defined in the appended claims.

We claim:

1. A method comprising:
   computing a first set of tuning parameters indicative of a color correction associated with a media output component of an apparatus;
   computing a second set of tuning parameters indicative of a color correction associated with a media capturing component of the apparatus;
   associating the first set of tuning parameters and the second set of tuning parameters with the apparatus for facilitating color tuning of the apparatus;
   facilitating access of a third test media content being captured by the media capturing component of the apparatus, the third test media content being associated with capture of a target surface, the target surface being associated with a target surface color data;
   determining a third test color data being associated with the third test media content;
   processing the third test media content by a processing component of the apparatus to generate a processed third media content, the processed third media content being associated with a processed media color data;
   outputting the processed third media content by the media output component associated with the apparatus; and
   determining an output media color data associated with the processed third media content being output at the apparatus.

2. The method as claimed in claim 1, wherein computing the first set of tuning parameters comprises:
   facilitating access of a first test media content being output at the media output component of the apparatus;
   determining a first test color data associated with the first test media content; and
   comparing the first test color data of the first test media content with a corresponding first reference color data for computing the first set of tuning parameters, the corresponding first reference color data being associated with a first reference media content.

3. The method as claimed in claim 1, wherein computing the second set of tuning parameters comprises:
   facilitating access of a second test media content being captured by the media capturing component of the apparatus;
   determining a second test color data associated with the second test media content; and
   comparing the second test color data with a corresponding second reference color data for computing the second set of tuning parameters, the second reference color data being associated with a second reference media content.

4. The method as claimed in claim 1, wherein associating the first set of tuning parameters and the second set of tuning parameters with the apparatus comprises associating the first set of tuning parameters with the media output component of the apparatus and the second set of tuning parameters with the media capturing component of the apparatus.

5. The method as claimed in claim 1, further comprising;
   comparing the target surface color data with the output media color data to perform verification of the first set of tuning parameters and the second set of tuning parameters.

6. The method as claimed in claim 1, further comprising;
   comparing the output media color data with the processed media color data to perform verification of the first set of tuning parameters.

7. The method as claimed in claim .1, further comprising;
   comparing the target surface color data with the third test color data to perform verification of the second set of tuning parameters.

8. An apparatus comprising:
   at least one processor; and
   at least one memory comprising computer program code, the at least one memory and the computer program code configured to, with the at least one processor, cause the apparatus to at least perform:
   compute a first set of tuning parameters indicative of a color correction associated with a media output component of an apparatus;
   compute a second set of tuning parameters indicative of a color correction associated with a media capturing component of the apparatus;
   associate the first set of tuning parameters and the second set of tuning parameters with the apparatus for facilitating color tuning of the apparatus;
   facilitate access of a third test media content being captured by the media capturing component of the apparatus, the third test media content being associated with capture of a target surface, the target surface being associated with a target surface color data;
   determine a third test color data being associated with the third test media content;
   process the third test media content by a processing component of the apparatus to generate a processed third media content, the processed third media content being associated with a processed media color data;
   output the processed third media content by the media output component associated with the apparatus; and
   determine an output media color data associated with the processed third media content being output at the apparatus.

9. The apparatus as claimed in claim 8, wherein for computing the first set of tuning parameters, the apparatus is further caused, at least in part, to:
   facilitate access of a first test media content being output at the media output component of the apparatus;
   determine a first test color data associated with the first test media content; and
   compare the first test color data of the first test media content with a corresponding first reference color data for computing the first set of tuning parameters, the corresponding first reference color data being associated with a first reference media content.

10. The apparatus as claimed in claim 8, wherein for computing the second set of tuning parameters, the apparatus is further caused, at least in part, to:
    facilitate access of a second test media content being captured data by the media capturing component of the apparatus;
    determine a second test color data associated with the second test media content; and
    compare the second test color data with a corresponding second reference color data for computing the second set of tuning parameters, the second reference color data being associated with a second reference media content.

11. The apparatus as claimed in claim 8, wherein the apparatus is further caused, at least in part, to associate the first set of tuning parameters and the second set of tuning parameters with the apparatus by associating the first set of tuning parameters with the media output component of the apparatus and the second set of tuning parameters with the media capturing component of the apparatus.

12. The apparatus as claimed in claim 8, wherein the apparatus is further caused, at least in part, to compare the target surface color data with the output media color data to perform verification of the first set of tuning parameters and the second set of tuning parameters.

13. The apparatus as claimed in claim 8, wherein the apparatus is further caused, at least in part, to compare the output media color data with the processed media color data to perform verification of the first set of tuning parameters.

14. The apparatus as claimed in claim 8, wherein the apparatus is further caused, at least in part, to compare the target surface color data with the third test color data to perform verification of the second set of tuning parameters.

15. A non-transitory computer readable medium comprising a set of instructions, which, when executed by one or more processors, cause an apparatus to at least perform:
  compute a first set of tuning parameters indicative of a color correction associated with a media output component of an apparatus;
  compute a second set of tuning parameters indicative of a color correction associated with a media capturing component of the apparatus;
  associate the first set of tuning parameters and the second set of tuning parameters with the apparatus for facilitating color tuning of the apparatus;
  facilitate access of a third test media content being captured by the media capturing component of the apparatus, the third test media content being associated with capture of a target surface, the target surface being associated with a target surface color data;
  determine a third test color data being associated with the third test media content;
  process the third test media content by a processing component of the apparatus to generate a processed third media content, the processed third media content being associated with a processed media color data;
  output the processed third media content by the media output component associated with the apparatus; and
  determine an output media color data associated with the processed third media content being output at the apparatus.

16. The non-transitory computer readable medium as claimed in claim 15, wherein for computing the first set of tuning parameters, the apparatus is further caused, at least in part, to:
  facilitate access of a first test media content being output at the media output component of the apparatus;
  determine a first test color data associated with the first test media content; and
  compare the first test color data of the first test media content with a corresponding first reference color data for computing the first set of tuning parameters, the corresponding first reference color data being associated with a first reference media content.

17. The non-transitory computer readable medium as claimed in claim 15, wherein for computing the second set of tuning parameters, the apparatus is further caused, at least in part, to:
  facilitate access of a second test media content being captured by the media capturing component of the apparatus;
  determine a second test color data associated with the second test media content; and
  compare the second test color data with a corresponding second reference color data for computing the second set of tuning parameters, the second reference color data being associated with a second reference media content.

* * * * *